(12) United States Patent
Mitsuya

(10) Patent No.: US 7,466,486 B2
(45) Date of Patent: Dec. 16, 2008

(54) POLARIZATION SEPARATING ELEMENT AND METHOD OF MANUFACTURING THE SAME

(75) Inventor: Shinji Mitsuya, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 161 days.

(21) Appl. No.: 11/064,697

(22) Filed: Feb. 23, 2005

(65) Prior Publication Data

US 2005/0200956 A1    Sep. 15, 2005

(30) Foreign Application Priority Data

Mar. 12, 2004    (JP) ................ 2004-070951

(51) Int. Cl.
*G02B 5/30* (2006.01)

(52) U.S. Cl. .............. 359/495; 359/583; 359/629; 359/500

(58) Field of Classification Search .......... None
See application file for complete search history.

(56) References Cited

U.S. PATENT DOCUMENTS 5,161,039 A * 11/1992 Schellenberg ............. 359/3
5,808,798 A * 9/1998 Weber et al. ............. 359/583
6,157,471 A 12/2000 Bignolles et al.
6,424,395 B1 * 7/2002 Sato et al. ............. 349/112
6,813,076 B2 * 11/2004 Okubo et al. ............. 359/484
2004/0036971 A1 * 2/2004 McGuire, Jr. ............. 359/499
2004/0218271 A1 * 11/2004 Hartmaier et al. ........ 359/494
2004/0258355 A1 * 12/2004 Wang et al. ............. 385/37

FOREIGN PATENT DOCUMENTS

FR    2 813 127    2/2002
JP    7-66084    7/1995

OTHER PUBLICATIONS

C. Joubert et al., "TN-LCD Viewing Angle Compensation with Holographic Volume Gratings," Jan. 28, 1999, Proceedings of SPIE, vol. 3635, pp. 137-142.
European Search Report dated May 24, 2005 from corresponding European Application No. 05005044.2.

* cited by examiner

*Primary Examiner*—Stephone B. Allen
*Assistant Examiner*—Derek S Chapel
(74) *Attorney, Agent, or Firm*—Beyer Law Group LLP

(57) ABSTRACT

A polarization separating element which can be easily manufactured without increasing the cost and can separate light into plural directions by using one sheet. A polarization separating element includes a structural birefringence body having a base body made of a photosensitive material of which periodic refractive index distributions are formed in plural directions and at least a pair of surfaces is formed in the base body in which one surface is a light incident location and the other surface is a light emitting location.

12 Claims, 6 Drawing Sheets

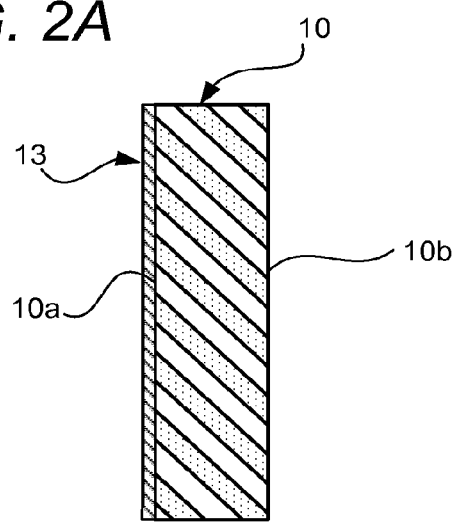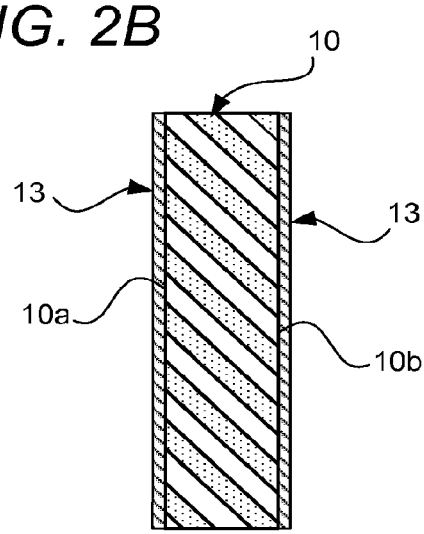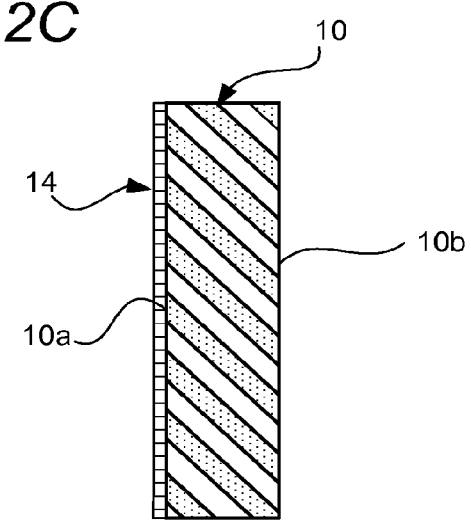

POLARIZATION SEPARATING ELEMENT AND METHOD OF MANUFACTURING THE SAME

BACKGROUND OF THE INVENTION

1. Field of the Invention

The present invention relates to a polarization separating element for synthesizing or separating beams into two beams of which the polarized directions are perpendicular to each other and a method of manufacturing the same, and particularly to a polarization separating element used in an optical low pass filter and the like for removing the moiré fringe in a video optical system and a method of manufacturing the same.

2. Description of the Related Art

In video optical systems having the structure that light receiving portions are periodically arranged as in a CCD (charge coupled device) camera or a CMOS (complementary metal-oxide semiconductor) image sensor, the image deterioration phenomenon called moiré may be generated. In order to prevent this phenomenon, a polarization separating element for synthesizing or separating beams into two beams of which the polarized directions are perpendicular to each other is provided.

Generally, crystals such as quartz or the like are used as a conventional polarization separating element. In this case, the light can be separated by inclining the crystal axis with respect to the incident light, and thus the polarization separating element depends on the birefringence of the crystal material itself. This is the polarization separating element using the birefringence of the material.

In addition, the polarization separating element has birefringence by regularly arranging particles having the wavelength smaller than that of the light. This is called structural birefringence (for example, see Japanese Examined Patent Application Publication No. 7-66084). For example, as shown in FIG. 11, dielectric thin films 101 and 102 each having a different refraction index are alternately laminated to form a structural birefringence plate 100. In the structural birefringence plate 100, the beams R incident into the inclined section 100a of the lamination surface of the lamination body formed by alternately laminating the dielectric thin films 101 and 102 are separated into ordinary light Eo and extraordinary light Ee1, of which the polarized waves are perpendicular to each other. The ordinary light Eo is refracted in the same direction as the incident direction and the extraordinary light Ee1 is refracted in the direction of an angle between the direction of the incident beam R and a lamination surface 100c and an angle determined by the shape birefringence value, thereby, separating the light. Thus, the structural birefringence plate functions as the polarization separating element.

However, the quartz is generally used as the polarization separating element using the birefringence of the material, but there are problems in that the quartz is expensive and it is difficult to perform the processes such as cutting or polishing with respect to the quartz.

Further, with respect to the structural birefringence body manufactured by laminating multi-dielectric thin films by a sputter device or the like, the laminated thin film is cut to be inclined and is used. However, there are problems in that the film thickness corresponding to the used area is required, (for example, in the case of manufacturing the structural birefringence body having several millimeters of square, it is necessary that at least 1000 dielectric thin films of several tens of millimeters be laminated), the manufacturing is difficult because of the removal due to the stress and the manufacturing time becomes long.

In addition, even in any case, in order to separate the light in the plural directions, a plurality of the structural birefringence plates need be laminated and thus there is a problem in that the thickness of the element increases, as shown in FIG. 11. In addition, in FIG. 11, a reference numeral 200 indicates the other structural birefringence plate formed by alternately laminating dielectric thin films 201 and 202 each having a different refractive index. The ordinary light Eo emitted from the structural birefringence plate 100 is incident into the inclined section of the laminated surface of the laminated body of the structural birefringence plate 200 and is separated into the ordinary light Eo and the extraordinary light Ee2 of which the polarized waves are perpendicular to each other.

SUMMARY OF THE INVENTION

The present invention is made up to solve the above-described problems, and it is an object of the present invention to provide a polarization separating element and a method of manufacturing the same, which can be easily manufactured without increasing the manufacturing cost thereof and can separate the light into the plural directions by using one sheet.

The polarization separating element according to the present invention comprises a structural birefringence body having a base body made of a photosensitive material having a periodic refractive index distribution, wherein at least a pair of surfaces is formed in the base body in which one surface is a light incident location and the other surface is a light emitting location.

In the polarization separating element according to the present invention, the base body made of the photosensitive material has the periodic refractive index distribution lower than of the light wavelength. As a result, if the light is incident to the periodic structure to be inclined, the optical birefringence is generated and thus the incident light can be polarized and separated.

In addition, since the polarization separating element according to the present invention can be manufactured by a simple method of forming the periodic refractive index distribution in the photosensitive material by a two-beam interference exposure method, the cost thereof does not increase.

In addition, it is preferable that in the polarizing separating element of the present invention, the direction of the periodic refractive index distribution (periodic structure) be inclined with respect to the normal line of the surface of the base body.

As such, by forming the periodic structure to be inclined with respect to the normal line of the surface of the base body, the incident direction of the light is taken in the vicinity of the vertical direction with respect to the surface of the base body and the setup is easy.

Moreover, in the polarizing separating element, it is preferable that, on the base body made of the photosensitive material, the periodic refractive distributions be formed in plural directions.

The polarization separating element used in an optical low pass filter for removing the moiré fringe in the video optical system having the structure in which light receiving portions are periodically arranged as in a CCD camera must polarize and separate the incident light in the plural directions. Since the conventional structural birefringence plate can separate the light only in one direction, the light cannot be separated in the plural directions unless the plural sheets each having a different direction are adhered. However, since the polarization separating element according to the present invention uses the structural birefringence body constructed by forming the refractive index distributions of the plural directions in the same base body, a plurality of structural birefringence plates are not required. Thus, the desired effect can be obtained by one structural birefringence body. Also, since the structural birefringence body according to the present invention can be manufactured by a simple method of forming the periodic refractive index distribution in the photosensitive material by a two-beam interference exposure method and performing the multi-exposure by changing the incident direction of the light through the rotation of the material, or exposing collectively the light of the plural directions to the photosensitive material, it can be easily manufactured without increasing the cost thereof.

Furthermore, in the polarization separating element of the present invention, the angles of the directions of the periodic refractive index distributions may be different from each other with respect to the normal line of the surfaces of the base body.

In the polarization separating element, since the periodic structure forming the plural angles with respect to the base body surface is formed, the birefringence is changed by changing the angle. Therefore, the polarization separating angle can be varied and thus the moiré fringe can be efficiently avoided.

Also, in the polarization separating element of the present invention, the intervals of the periodic refractive index distributions of the plural directions are different from each other.

In the polarization separating element, since the interval of one periodic refractive index distribution (interval of the periodic structure) is different from that of the other periodic refractive index distribution (interval of the periodic structure), there are plural polarization separating angles. Thereby, the obscurity of the light can be controlled, and thus the control without unnaturalness can be easily performed while removing the moiré fringe.

In addition, in the polarization separating element of the present invention, the polarization separating element may further comprise the reflection preventing film. In the polarization separating element, by forming the film not having the surface reflection (reflection preventing film) on at least one surface of the structural birefringence body, the performance as the polarization separating element is improved and the deviation upon the manufacture thereof can be suppressed. The reflection preventing film may be formed on the both surfaces of the structural birefringence body.

Moreover, in the polarization separating element of the present invention, a band pass filter layer passing through visible light may be further comprised.

A method of manufacturing a polarization separating element of the present invention comprises the steps of inputting two beams to a photosensitive material of which the refractive index is changed by irradiating the light so that an interference fringe is generated in the material, reacting the interference fringe with the material to form a base body made of a photosensitive material having a periodic refractive index distribution corresponding to the interference fringe, and forming at least a pair of surfaces serving as a light incident location and a light emitting location.

By this method, the structural birefringence body composed of the base body made of the photosensitive material in which the periodic refractive index distribution is formed can be easily formed. By inputting the light to be inclined with respect to the formed periodic structure, the light can be polarized and separated.

Further, in the method of manufacturing the polarization separating element of the present invention, the direction of the periodic refractive index distribution is inclined to the normal line of the surface of the base body.

Furthermore, in the method of manufacturing the polarization separating element of the present invention, after the steps of inputting two beams to the photosensitive material and forming the periodic refractive index distribution, a step of changing the incident direction of the light to input the two beams again are performed at least one time so that the multi-exposure process is performed and the base body made of the photosensitive material of which the periodic refractive index distributions are formed in the plural directions is formed.

In the method of exposing the photosensitive material to the light to form the refractive index distribution in the photosensitive material, by performing a plurality of the exposing processes, the refractive index distributions of the plural directions can be formed in the base body.

Further, since it can be formed by a very simple method of rotating the base body made of the photosensitive material to perform the plurality of the exposing processes, the manufacturing cost does not increase.

Furthermore, in the method of manufacturing the polarization separating element of the present invention, the base body made of the photosensitive material in which the periodic refractive index distributions are formed in the plural directions is formed by collectively inputting and exposing the light to the photosensitive material of which the refractive index is changed by irradiating the light in the plural directions.

In the above-described method of manufacturing the polarization separating element, the photosensitive material is exposed by the plural times. However, by increasing the number of the beams and collectively forming the periodic refractive index distributions in the plural directions by setting the direction of the beam to the plural directions, the manufacturing process can be reduced.

Further, in the method of manufacturing the polarization separating element of the present invention, the periodic refractive index distributions are formed in the plural directions and the base body made of the photosensitive material of which the directions of the periodic refractive index distributions are different from each other with respect to the normal line of the base body surface is formed, by changing an incident angle of the light incident to the photosensitive material for each of the plural directions.

In the manufacturing method, by inputting and exposing the light to the photosensitive material in the plural directions each having a different incident angle, the base body composed of the photosensitive material in the periodic structure forming the plural angles with respect to the normal line of the surfaces of the base body is formed can be formed.

Further, in the method of manufacturing the polarization separating element of the present invention, the periodic refractive index distributions are formed in the plural directions and the base body made of the photosensitive material in which the intervals of the periodic refractive index distributions are different from each other with respect to the normal line of the base body surface is formed, by changing a wavelength of the light incident to the photosensitive material for each of the plural directions.

In this manufacturing method, by inputting the light having different wavelengths to the photosensitive material in the plural directions, the interval of the interference fringe generated in the material is controlled and the intervals of the periodic refractive index distributions in the plural directions formed in the base body is different. Thus, the plural polarization separating angles can be formed and the wavelength dependency of the polarization separating element can be adjusted.

BRIEF DESCRIPTION OF THE DRAWINGS

FIG. 2A is a cross-sectional view showing the structural birefringence body with a reflection preventing film formed on the incident surface thereof;

FIG. 2B is a cross-sectional view showing the structural birefringence body with reflection preventing films formed on the incident surface and the emitted surface thereof;

FIG. 2C is a cross-sectional view showing the structural birefringence body with a band pass filter layer formed thereon;

DESCRIPTION OF THE PREFERRED EMBODIMENTS

Figure 1:
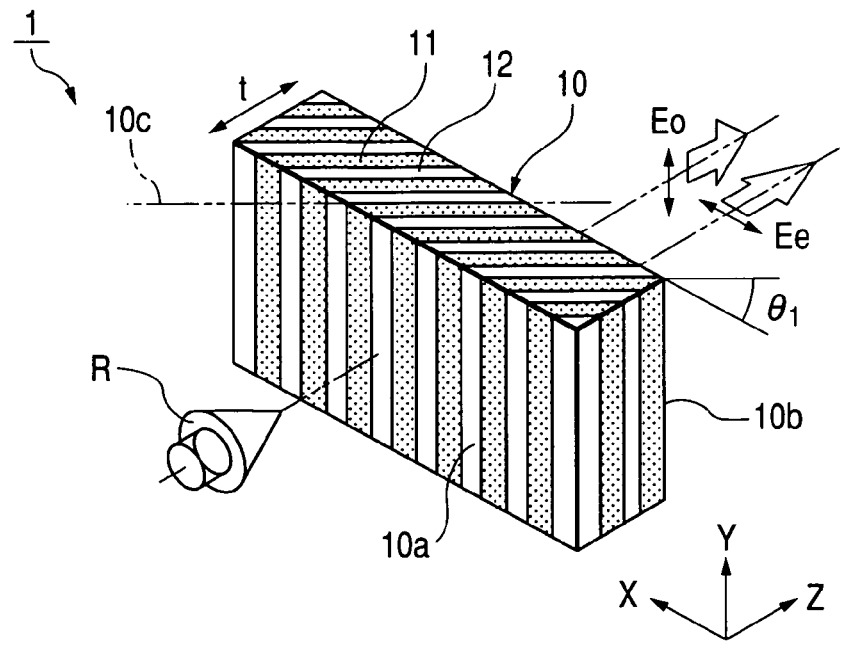
FIG. 1 is a schematic perspective view showing the structure of a polarization separating element according to a first embodiment of the present invention.

Next, embodiments of the present invention will be explained in detail with reference to the accompanying drawings.

In addition, the present invention is not limited to the embodiments, which will be described in detail later, and, in the drawings, the reduced scale is changed for each constituent element so that each constituent element is easily shown in the drawings.

First Embodiment

Figure 2:
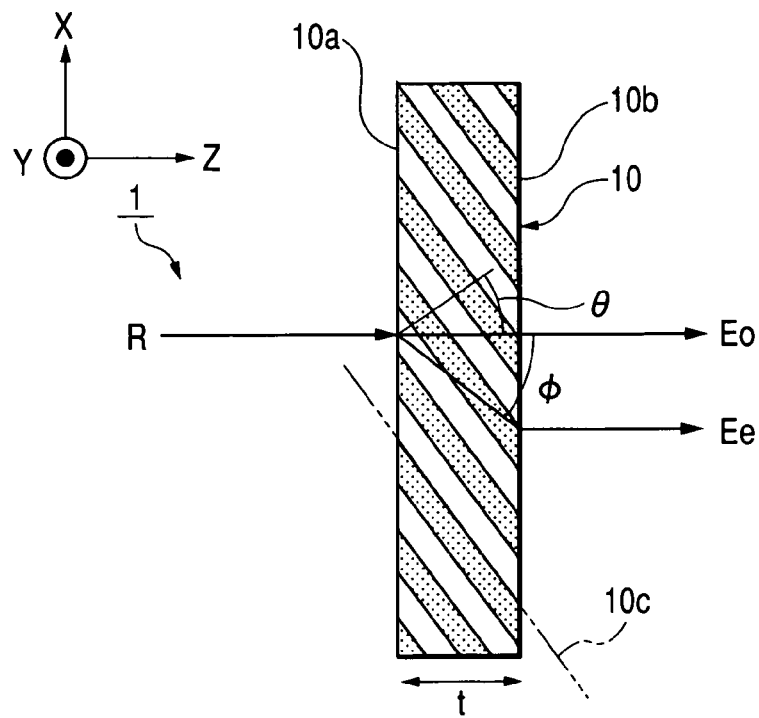
FIG. 2 is a cross-sectional view showing the polarization separating element of FIG. 1.

FIG. 1 is a schematic perspective view showing the structure of a polarization separating element according to a first embodiment of the present invention, and FIG. 2 is a cross-sectional view of the polarization separating element of FIG. 1.

The polarization separating element 1 of the present embodiment has a plate shape as a whole and comprises a structural birefringence body 10 composed of a base body made of a photosensitive material having periodic refractive index distribution.

A thickness t of the structural birefringence body 10 is about several tens of micrometers to several hundreds of micrometers.

In the base body made of the photosensitive material, a first region 11 having a low refractive index and a second region 12 having a refractive index higher than that of the first region 11 are alternately formed and periodic refractive index distributions are formed.

The base body made of the photosensitive material has at least a pair of surfaces. One of the pair of surfaces is a light incident location and the other of the pair of surfaces is a light emitting location.

In addition, in the base body made of the photosensitive material, the periodic refractive distribution (periodic structure) is formed such that the direction thereof is inclined to the normal line of the base body surface. Particularly, one surface (incident surface) 10a is inclined at a predetermined angle with respect to the interface of the first region 11 and the second region 12 (the direction parallel to the interface is shown by a virtual line 10c) and the other surface (emitted surface) 10b is inclined at a predetermined angle with respect to the interface of the first region 11 and the second region 12.

In the case in which the refractive index of the first region 11 is n1, the width of the first region 11 is d1, the refractive index of the second region 12 is n2, and the width of the second region 12 is d2, it is necessary that the relationships of $n1 < n2$ and $n1 \neq n2$ be satisfied. However, in the widths d1 and d2, the relationship may be $d1 = d2$ or $d1 \neq d2$.

The polarization separating element 1 according to the present embodiment is equal in the structure with respect to the Y direction shown in FIGS. 1 and 2 and the interface of the first region 11 and the second region 12 (the direction parallel to the interface is shown by a virtual line 10c) is inclined at a predetermined angle with respect to the Z direction which is the incident direction of the incident light R. In other words, the interface has a predetermined intersection angle θ1 together with the inclined section 10a of the incident side parallel to the X direction and the inclined section 10b of the emitted side parallel to the inclined section 10a, respectively.

Figure 3:
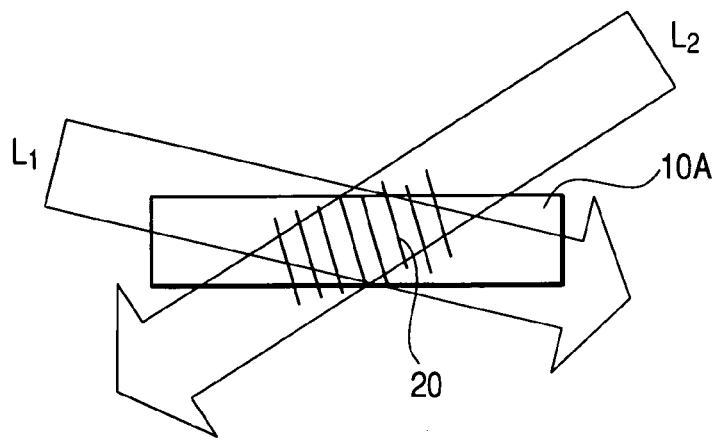
FIG. 3 is an explanatory view showing a method of manufacturing the polarization separating element of the first embodiment.
Figure 4:
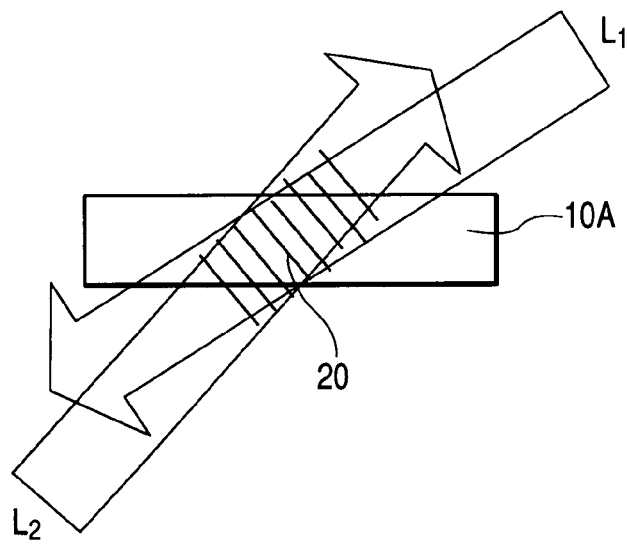
FIG. 4 is an explanatory view showing the other method of manufacturing the polarization separating element of the first embodiment.

In order to manufacture the polarization separating element 1, as shown in FIGS. 3 and 4, two beams L1 and L2 are incident to the photosensitive material 10A of which the refractive index is changed by irradiating the light, the interference fringe 20 is generated in the material, and the interference fringe 20 is reacted with the material, thereby obtaining the structural birefringence body composed of the base body made of the photosensitive material having the periodic refractive index distribution corresponding to the interference fringe 20. Particularly, in the portion corresponding to the interference fringe 20, the first region 11 having a low refractive index is formed, and, in the portion not corresponding to the interference fringe 20, the second region 12 is formed.

Also, in FIG. 3, two beams L1 and L2 each having a different direction are emitted from one side of the photosensitive material 10A and two beams L1 and L2 are irradiated so as to intersect in the photosensitive material 10A. In FIG. 4, the beam L1 is emitted from one side of the photosensitive material 10A, the beam L2 of which the direction is different from that of the beam L1 is emitted from the other side thereof, and these two beams L1 and L2 are irradiated so as to intersect in the photosensitive material 10A.

As the photosensitive material, there is photopolymerization type or cross-linking type. In the photopolymerization type, the most material is composed of the combination of binder and at least one kind of monomer. Besides, sensitizer, photoinitiator, or other additive may be mixed. The composition or ratio thereof is suitably determined according to the various purposes. The photosensitive material used in the present embodiment is to mix binder, polymer, monomer, initiator and sensitizer or the like as the photopolymerization material and has wide sensitivity from the blue light to the red light. Also, as the photosensitive material used in the present embodiment, a photopolymer material of which the refractive index is changed by irradiating the light may be used.

Since the polarization separating element 1 of the present embodiment has the above-described structure, as shown in FIGS. 1 and 2, when the light R is incident from the left side in a predetermined direction, that is, the Z direction in the drawings, the optical birefringence is generated and the incident light R is separated into the ordinary light Eo which is polarized in the Y direction and the extraordinary light Ee which is polarized in the X direction at a predetermined polarization separating angle f. Also, in FIG. 2, the reference numeral θ is an angle between the direction of the incident light R and the interface between the first region 11 and the second region 12.

Since the polarization separating element 1 of the present embodiment can be manufactured by a simple method of forming the periodic refractive index distribution lower than the light wavelength in the photosensitive material by two-beam interference exposure method, the cost thereof does not increase.

In addition, in the structure of the present embodiment, if the difference between refractive indexes of the first region 11 and the second region 12 increases, the shape birefringence increases and the separating angle f increases.

Moreover, a reflection preventing film 13 composed of the dielectric multilayered films may be on at least one surface of the structural birefringence body 10. For example, if the reflection preventing film 13 is formed on the incident surface 10a of the structural birefringence body 10, as shown in FIG. 2A, the loss of the intensity of the light transmitting the incident surface 10a can be suppressed and thus the performance thereof as the polarization separating element can be improved. In addition, by forming the reflection preventing film 13 on the emitted surface 10b as well as the incident surface 10a, as shown in FIG. 2B, the multi-reflection in the structural birefringence body 10 is suppressed, the unnecessary interference light is not generated, and thus the performance as the polarization separating element can be further improved. Also, upon manufacturing the structural birefringence body 10, the surplus interference fringe due to the multi-reflection to the photosensitive material is not recorded and thus the performance deterioration of the polarization separating element or the deviation of the precision can be suppressed.

Further, in the case in which the structural birefringence body 10 has a support substrate, such as glass, which is contacted with at least one surface of the base body made of the photosensitive material and supports the base body composed of the photosensitive material, the reflection preventing film may be formed on the support substrate surface. Even in this case, the same effect can be obtained.

In addition, as shown in FIG. 2C, a band pass filter layer 14 being capable of transmitting the visible light may be formed on at least one surface of the structural birefringence body 10. Thus, for example, in the case in which the structural birefringence body 10 is arranged at the light receiving portion of a CCD camera, the light of the unnecessary band other than the visible image can be cut and the quality of the CCD camera can be improved.

Second Embodiment

Figure 5:
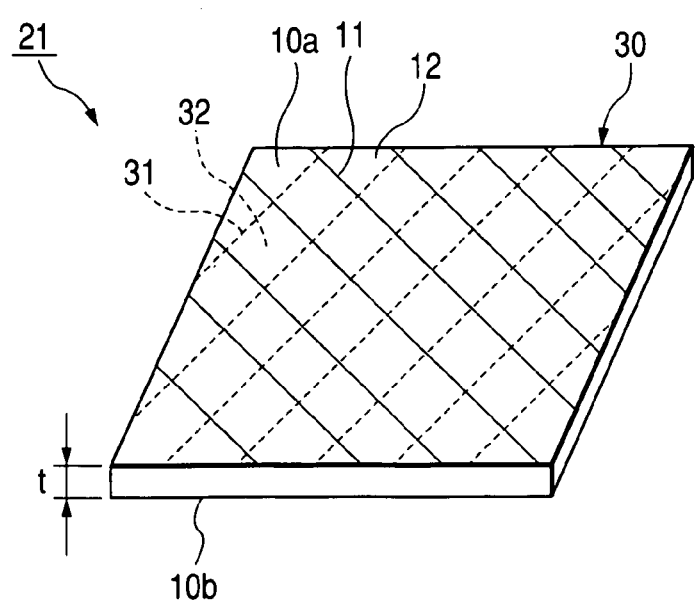
FIG. 5 is a schematic perspective view showing the structure of a polarization separating element according to a second embodiment of the present invention.
Figure 6:
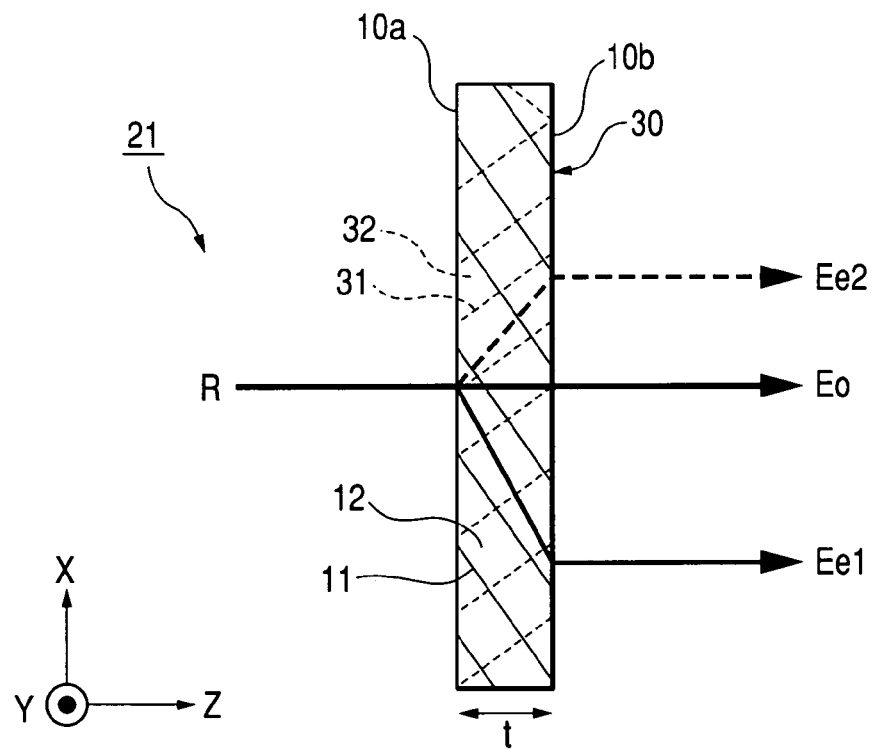
FIG. 6 is a cross-sectional view showing the polarization separating element of FIG. 5.

FIG. 5 is a schematic perspective view showing the structure of a polarization separating element according to a second embodiment of the present invention, and FIG. 6 is a cross-sectional view of the polarization separating element of FIG. 5.

The polarization separating element 21 of the second embodiment is different from the polarization separating element 1 of the first embodiment in that the periodic refractive index distributions are formed on a structural birefringence body 30 composed of a base body made of a photosensitive material in plural directions (in the drawings, two directions).

Similarly to the first embodiment, on the base body made of the photosensitive material, a first region 11 having a low refractive index and a second region 12 having a high refractive index are alternately formed in one direction. In addition, a third region 31 having a low refractive index and a fourth region 32 having a high refractive index are alternately formed in the other direction.

In addition, the periodic refractive index distribution (periodic structure) of the other direction of the base body made of the photosensitive material is formed to be inclined with respect to the normal line of the base body surface. Particularly, one surface (incident surface) 10a of the base body made of the photosensitive material is inclined at a predetermined angle with respect to the interface between the third region 31 and the fourth region 32 and the other surface (emitted surface) 10b is inclined at a predetermined angle with respect to the interface between the third region 31 and the fourth region 32.

In the case in which the refractive index of the third region 31 is n3, the width of the third region 31 is d3, the refractive index of the fourth region 32 is n4, and the width of the fourth region 32 is d4, it is necessary that the relationships of n3<n4 and n3≠n4 be satisfied. However, in the widths d3 and d4, the relationship may be d3=d4 or d3≠d4.

The refractive indexes n1 and n3 and the widths d1 and d3 of the first region 11 and the third region 31 may be different from each other and the refractive indexes n2 and n4 and the widths d2 and d4 of the second region 12 and the fourth region 32 may be different from each other. Also, in the case in which the incident light R is separated at the same angle so as to correspond to the refractive index distribution direction, it is necessary that the relationships of n1=n3, n2=n4, d1=d3 and d2=d4 be satisfied. However, in the case of being desired to change the separating angle, the refractive index and the width are suitably changed and thus the adjustment can be made. Here, adjusting the optical output in the exposure or the exposure time can change the refractive index and adjusting the light wavelength or the relative angle of two beams can change the width.

Figure 7:
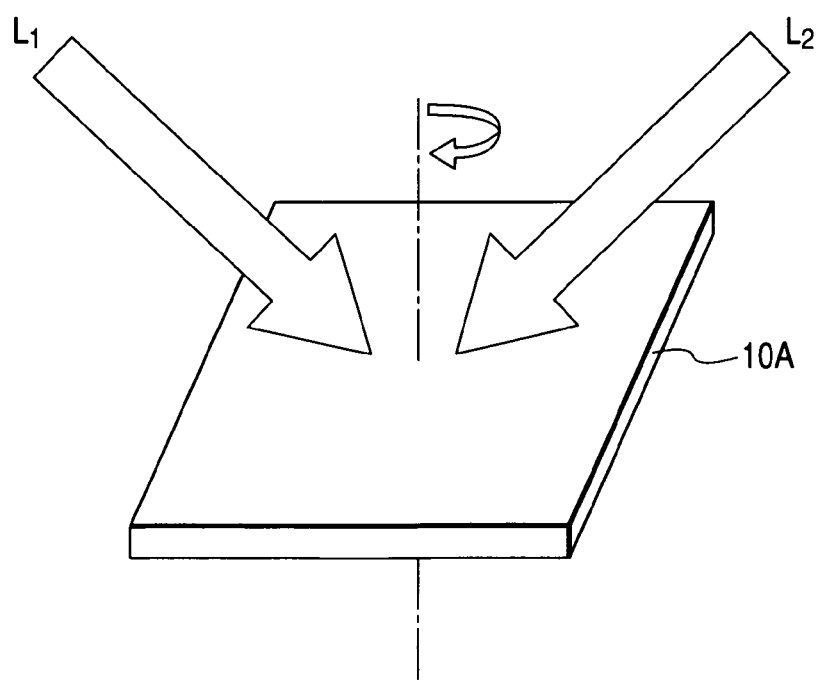
FIG. 7 is an explanatory view showing a method of manufacturing the polarization separating element of the second embodiment.

In order to manufacture the polarization separating element 21, for example, as shown in FIG. 3, two beams L1 and L2 are incident to the photosensitive material 10A of which the refractive index is changed by irradiating the light, so that the interference fringe 20 is generated in the material. By reacting the interference fringe 20 with the material, the periodic refractive index distribution (one periodic refractive index distribution) corresponding to the interference fringe 20 is formed. Then, as shown in FIG. 7, the photosensitive material 10A is rotated at a predetermined angle (excluding the integer times of 180 degrees) at circumference of the axis extending in the vertical direction shown in the drawing, so that the incident direction of the light is changed. Then, two beams L1 and L2 are incident again so that the interference fringe is generated in the material. By reacting the interference fringe with the material, the periodic refractive index distribution (the other periodic refractive index distribution) corresponding to the interference fringe is formed. Thus, the above-described process of forming the periodic refractive index distribution is performed by at least one time so as to perform the multi-exposure process, thereby obtaining the structural birefringence body 30 composed of the base body made of the photosensitive material in which the periodic refractive index distributions are formed in plural directions.

Moreover, in the method of manufacturing the polarization separating element, the photosensitive material is exposed by the plural times. However, by increasing the number of the beams and setting the direction of the beams to the plural directions, the polarization separating element 21 according to the present embodiment can be manufactured by a method of collectively forming the refractive index distributions in the plural directions.

Also, when the light is incident to the photosensitive material in the plural directions, the wavelength of the incident light is changed in the respective direction, and the periodic refractive index distributions are formed in the plural directions and the periodic refractive index distributions in the plural directions allow the base body made of the photosensitive material having a different periodic refractive index interval to be manufactured.

Since the polarization separating element of the present embodiment is composed of the structural birefringence body made by forming the refractive index distributions of the plural directions in the base body made of the same photosensitive material, as shown in FIG. 6, when the light R is incident from the left side of the same drawing in a predetermined direction, that is, the Z direction, the optical birefringence is generated, so that the incident light R is separated into the ordinary light Eo and the extraordinary light Ee1 and Ee2 of which the polarized waves are perpendicular to each other.

According to the present embodiment, the polarization separating element can be easily manufactured without increasing the cost thereof and can separate the light in the plural directions by using one sheet.

Figure 8:
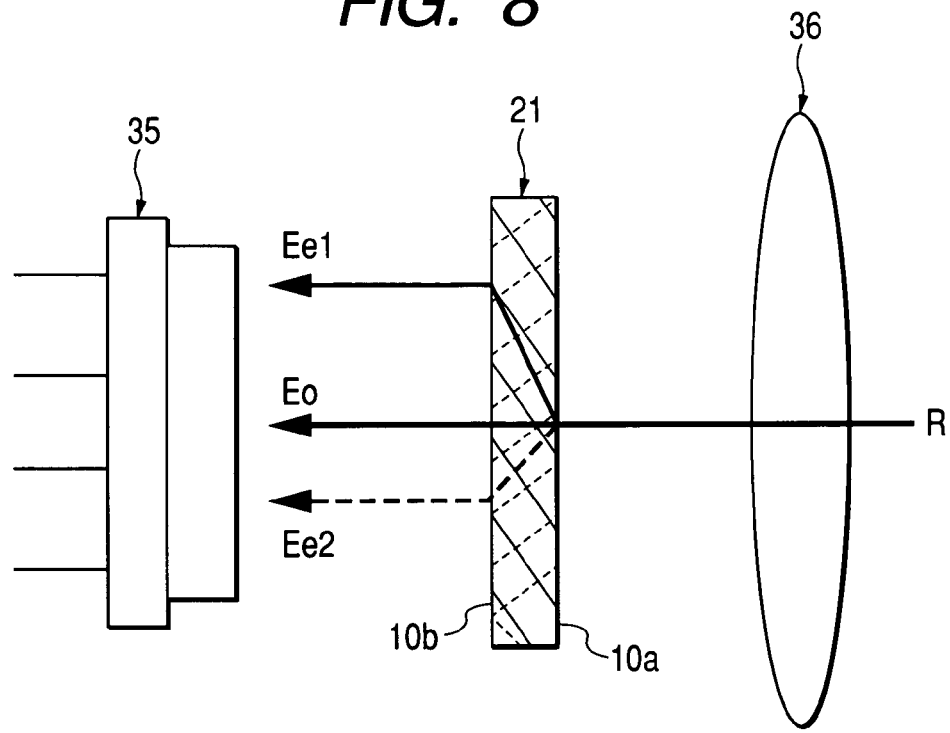
FIG. 8 is a schematic view showing a video optical system in which the polarization separating element of the second embodiment is included as an optical low pass filter.

FIG. 8 illustrates an example of using the polarization separating element 21 having the above-described structure in an optical low pass filter. In FIG. 8, the reference numeral 35 is a CCD camera and the reference numeral 36 is a lens provided in the front side of the CCD camera 35. The polarization separating element 21 of the present embodiment is provided between the CCD camera 35 and the lens 36 as the optical low pass filter. Here, the polarization separating element 21 is arranged such that the side of the incident surface 10a becomes the side of the lens 36.

According to the CCD camera 35 provided with the polarization separating element 21 of the present embodiment, although only one polarization separating element is formed, the moiré fringe generated by the light receiving portion having the periodically arranged structure can be avoided and thus a good image can be obtained.

Third Embodiment

Figure 9:
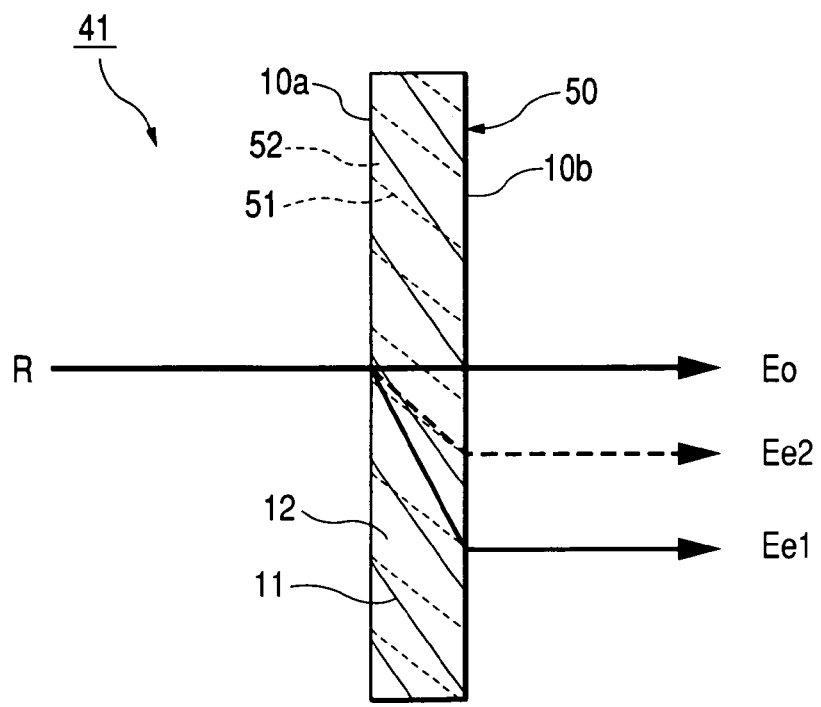
FIG. 9 is a schematic cross-sectional view showing the structure of a polarization separating element of a third embodiment.

FIG. 9 is a schematic cross-sectional view showing the structure of a polarization separating element according to a third embodiment of the present invention.

The polarization separating element 41 of the third embodiment is different from the polarization separating element 21 of the second embodiment in that the periodic refractive index distributions are formed on a structural birefringence body 50 composed of a base body made of a photosensitive material in plural directions (in FIG. 9, two directions) each having a different angle with respect to the normal line of the base body surface.

Specifically, similarly to the first or second embodiment, on the base body made of the photosensitive material, a first region 11 having a low refractive index and a second region 12 having a high refractive index are alternately formed in one direction. Also, a third region 51 having a low refractive index and a fourth region 52 having a high refractive index than the third region 51 are alternately formed in the other direction. The directions of the periodic refractive index distributions in the two directions have the different angles with respect to the normal line of the base body surface, respectively.

Figure 10:
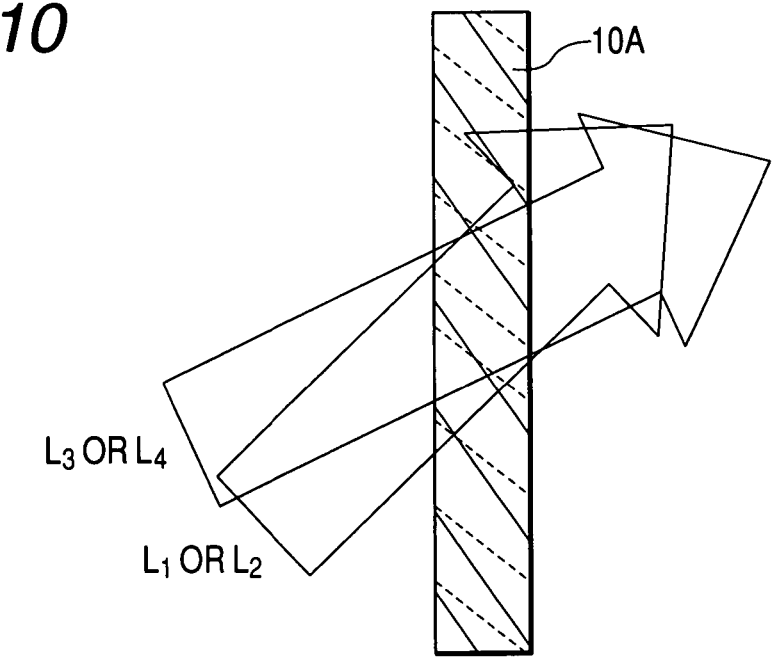
FIG. 10 is an explanatory view showing a method of manufacturing the polarization separating element according to the third embodiment.
Figure 11:
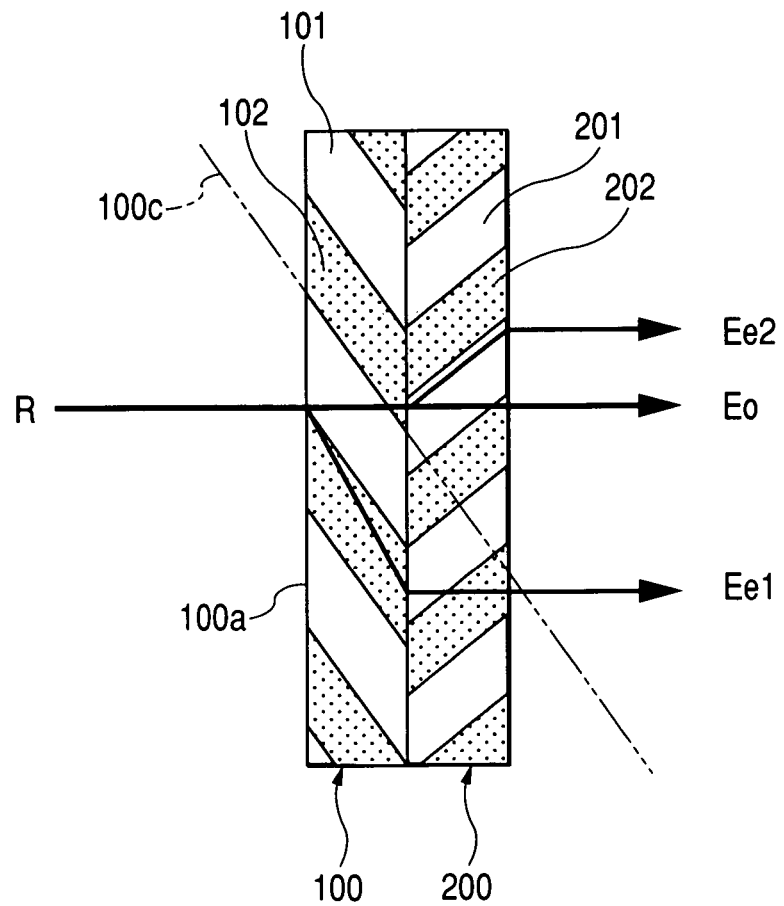
FIG. 11 is a schematic cross-sectional view showing a conventional polarization separating element.

The method of manufacturing the polarization separating element 41 of the third embodiment is different from the method of manufacturing the polarization separating element 21 of the second embodiment, in that the light incident to the photosensitive material in the plural directions has the changed incident angle in the respective direction. For example, as shown in FIG. 10, at least one incident angle of the two beams L3 and L4 incident to the photosensitive material 10A in order to form the other periodic refractive index distribution may be different from the incident angles of the two beams L1 and L2 incident to the photosensitive material in order to form one periodic refractive index distribution.

According to the polarization separating element 41 of the present embodiment, a periodic structure forming the plural angles with respect to the normal line of the base body surface is formed by having the above-described structure, and thus the birefringence is also changed by the changing the angle. As a result, the polarization separating angle can be changed, and in the case of using the polarization separating element of the present embodiment as the optical low pass filter, the moiré fringe can be efficiently avoided.

In addition, in the case of forming the periodic refractive index distributions in the plural directions, the method of changing the angle of the beam incident to the photosensitive material as described in the present embodiment and the method of changing the incident direction of the beam incident to the photosensitive material as described in the second embodiment (see FIG. 7) may be combined.

What is claimed is:

1. A polarization separating element comprising a structural birefringence body having a base body made of a photosensitive material having a periodic refractive index distribution, wherein at least a pair of surfaces is formed in the base body in which one surface is a light incident location and the other surface is a light emitting location,
wherein a direction of an interface of the periodic refractive index distribution is neither parallel nor perpendicular with respect to a normal line of an incident surface of the base body, the direction of the interface being inclined at a predetermined angle with respect to the incident surface, and being further inclined at a predetermined angle with respect to a direction of incident light, and
wherein the periodic refractive index distribution includes:
a first periodic refractive index distribution formed in a first direction with a first periodic interval; and
a second periodic refractive index distribution formed in the same base body in a second direction different from the first direction with a second periodic interval.

2. The polarization separating element according to claim 1,
wherein angles of the directions of the first and second periodic refractive index distributions are different from each other with respect to the normal line of the surfaces of the base body.

3. The polarization separating element according to claim 1,
wherein the first and second periodic intervals of the periodic refractive index distributions are different from each other.

4. The polarization separating element according to claim 1, further comprising a reflection preventing film.

5. The polarization separating element according to claim 1, further comprising a band pass filter layer transmitting light in a visible wavelength range.

6. The polarization separating element according to claim 1, wherein the periodic refractive index distribution forms a periodic birefringence structure corresponding to an interference fringe pattern.

7. A polarization separating element comprising a structural birefringence body, the structural birefringence body comprising:
base body made of a photosensitive material having a periodic refractive index distribution, the base body having an incident surface through which incident light enters and an emitting surface from which the light is emitted, the periodic refractive index distribution including alternatively formed first regions and second regions interfacing each other, the first regions having a first refractive index and the second regions having a second refractive index different from the first refractive index,
wherein a direction of interfaces of the first and second regions is neither parallel nor perpendicular with respect to a normal line of the incident surface of the base body, the direction being inclined at a predetermined angle with respect to the incident surface of the base body, and
wherein the periodic refractive index distribution includes:
a first periodic refractive index distribution including the alternatively formed first regions and second regions interfacing each other which are formed in a first direction with a first periodic interval; and
a second periodic refractive index distribution including alternatively formed third regions and fourth regions interfacing each other which are formed in the same base body in a second direction different from the first direction with a second periodic interval, the third regions having a third refractive index and the fourth regions having a fourth refractive index different from the third refractive index.

8. The polarization separating element according to claim 7, wherein the periodic refractive index distribution forms a periodic birefringence structure corresponding to an interference fringe pattern.

9. The polarization separating element according to claim 7,
wherein angles of the directions of the first and second periodic refractive index distributions are different from each other with respect to the normal line of the surfaces of the base body.

10. The polarization separating element according to claim 7,
wherein the first and second periodic intervals of the periodic refractive index distributions are different from each other.

11. The polarization separating element according to claim 7, further comprising a reflection preventing film.

12. The polarization separating element according to claim 7, further comprising a band pass filter layer transmitting light in a visible wavelength range.

* * * * *